April 9, 1968     H. W. BOTELER     3,376,887
DIAPHRAGM VALVES WITH MULTI-PART COMPRESSORS
Filed Jan. 28, 1966     7 Sheets-Sheet 1

FIG. 1

INVENTOR.
HENRY W. BOTELER
BY David D. McKenney
ATTORNEY

INVENTOR.
HENRY W. BOTELER

INVENTOR.
HENRY W. BOTELER
BY David D. McKenney
ATTORNEY

FIG. 10

INVENTOR.
HENRY W. BOTELER

April 9, 1968

H. W. BOTELER 3,376,887

DIAPHRAGM VALVES WITH MULTI-PART COMPRESSORS

Filed Jan. 28, 1966

INVENTOR.
HENRY W. BOTELER
BY *David D. McKenney*
ATTORNEY

United States Patent Office 3,376,887
Patented Apr. 9, 1968

3,376,887
DIAPHRAGM VALVES WITH MULTI-PART COMPRESSORS
Henry W. Boteler, East Greenwich, R.I., assignor to Grinnell Corporation, Providence, R.I., a corporation of Delaware
Filed Jan. 28, 1966, Ser. No. 523,621
12 Claims. (Cl. 137—316)

ABSTRACT OF THE DISCLOSURE

A diaphragm valve actuating mechanism having a multi-part compressor in which, during assembly of the valve, one compressor part can be temporarily held in a position, relative to another compressor part, which is more favorable to the connection of the diaphragm than the normal relative positions of these compressor parts with respect to each other.

---

This kind of valve customarily has the diaphragm periphery clamped to the rim of a body opening by a bonnet housing the compressor. The connection of the diaphragm to the compressor is at the unclamped diaphragm center which the compressor bulges through the body opening and against a seating to close the valve. The seating is usually in the form of a transverse concave band on the interior body surface opposite the diaphragm opening and usually has its ends merging smoothly into the opening rim. The actuating mechanism is arranged so as to move the various compressor parts independently and thereby seat different portions of the diaphragm at different times with desirable results. For example, during the initial opening movements one diaphragm portion can be withdrawn from the center of the seating band while other portions are still being held against the ends thereof. During subsequent opening movements the other diaphragm portions can also be withdrawn while the one portion is being further withdrawn. One reason why the results of such operation are desirable is that the percentage by which the flow changes (percentage of the flow rate before the change) for each increment of stem movement from closed to open position has not decreased as rapidly in such valves as in the prior art valves having single-part compressors and in some cases may not decrease at all. In one special case, where such percentage actually remains constant, the valve is said to have an "equal percent" characteristic curve which means that a given movement of the stem when the valve is very nearly closed has no greater an effect on the flow at that time than the same increment of stem movement would have on the flow when the valve is in any other position.

The best way which has been discovered thus far for holding some diaphragm portions closed while others are being opened has involved the use of a spring acting on at least one of the compressor parts. The difficulty has been that unless bulky fixtures are used for temporarily overcoming this spring action it prevents certain diaphragms from being easily attached to the compressor when the bonnet and actuating mechanism are apart from the body and otherwise ready for such attachment.

Thus, in the case of a two-part compressor there is usually a center part, secured to the lower end of the valve stem in the customary way, and an annular outer part encircling the center part and movable with respect thereto between first and second relative positions. In one relative position of the parts their diaphragm-engaging surfaces cooperate to follow the curve of the seating, and, in this first relative position, diaphragms of any of the usual molded configurations may be connected to the center part without having to be first distorted. In other relative positions of the parts, however, the diaphragm engaging surface of the center part is withdrawn substantially out of registration with the diaphragm-engaging surface of the outer part, and so called "molded closed" diaphragms cannot be connected to the center compressor part without having their domed center portions turned inside out. Because the arrangement of the spring has up to now, been determined solely by its intended operation in the assembly valve, the compressor parts are always spring-held in the most unfavorable of these other relative positions when the bonnet and actuating mechanism are apart from the body and await attachment of the diaphragm. The flexibility of these "molded closed" diaphragms theoretically enables them to be distorted enough to make connection while the compressor parts are thus held but such distortion is difficult and requires special fixtures. This is particularly true when the diaphragm is formed of one of the stiff corrosion-resistant plastics such as polytetrafluoroethylene.

In the case of the two-part compressor the present invention best overcomes this difficulty by providing a bonnet stop located so as to arrest the outer compressor part at a certain point when the stem is moved in a closing direction. Thereafter further movement of the stem in this direction advances the center part far enough with respect to the arrested outer part to allow the diaphragm stud to be connected without the diaphragm's domed portion having to be reversed.

It has been customary to assembly each prior art diaphragm valve, having a single compressor part or multiple compressor parts, by first advancing the compressor until its diaphragm engaging surfaces extend somewhat beyond the bonnet end and by holding it there while the diaphragm stud is being threaded into the appropriate compressor hole. In this special position of the parts the bonnet end cannot interfere with the diaphragm rotation by which this threading is accomplished, but it is also usually true that when the diaphragm is fully connected its periphery is still spaced from the bonnet end. For mounting this sub-assembly on the body it is preferred that the diaphragm periphery lie close to the bonnet end, and this is easily achieved after diaphragm connection by slight actuation of the stem in a valve-opening direction.

The stop of the present invention is located to provide a similar spacing after the diaphragm has been fully connected to the center compressor part, and once the diaphragm is thus fully connected the stem can be moved in a valve-opening direction, as in the prior art, to bring the diaphragm periphery adjacent to the bonnet end. This valve-opening movement withdraws the outer compressor part from engagement with the stop before the above-mentioned spacing is eliminated, and hence after complete valve assembly the stop will not interfere with the action of the outer compressor part on the portions of the diaphragm adjacent to it.

Accordingly it is one object of the present invention to provide a diaphragm valve of the kind wherein independently movable compressor parts are urged into such positions relative to each other that the molded configuration of certain diaphragms prevent their connection to one compressor part without diaphragm distortion and wherein special operation of this mechanism, when it is apart from the body, temporarily holds the compressor parts in a relative position permitting diaphragm connection without diaphragm distortion.

Another object is to provide an actuating mechanism of the kind described wherein the first mentioned relative position of the compressor parts holds their diaphragm-engaging surfaces out of registration and wherein the second-mentioned relative position of the compressor parts locates such surfaces closer to registration.

Another object is to provide a diaphragm valve of the kind described in which the compressor parts are housed in a bonnet and wherein the temporary holding is achieved by a stop therein.

Another object is to provide a diaphragm valve of the kind described in which the stop is so located that it cannot hold the compressor parts when the valve is completely assembled.

Another object is to provide a diaphragm valve of the kind described wherein the compressor parts are movable to a point at one end of the bonnet when the mechanism is actuated in a valve-closing direction, wherein the stop arrests one of the compressor parts at this point, and wherein at least one of the other compressor parts is thereafter movable to achieve the second-mentioned relative position when the mechanism is thereafter further actuated in the same direction.

Another object is to provide a diaphragm valve of the kind described wherein the compressor parts are urged into the first-mentioned relative position by a spring.

Another object is to provide a diaphragm valve of the kind described wherein the stop comprises a plurality of projections on the interior bonnet wall in spaced relation therearound.

Another object is to provide a diaphragm valve of the kind described in which at least one stop prevents rotation of the compressor.

Other objects will appear hereinafter.

The best modes in which I have contemplated applying the principles of the present invention are shown in the accompanying drawings but these are to be deemed primarily illustrative for it is intended that the claims shall cover by suitable expression in the appended claims whatever of patentable subject matter resides in the invention disclosed.

Figure 1:
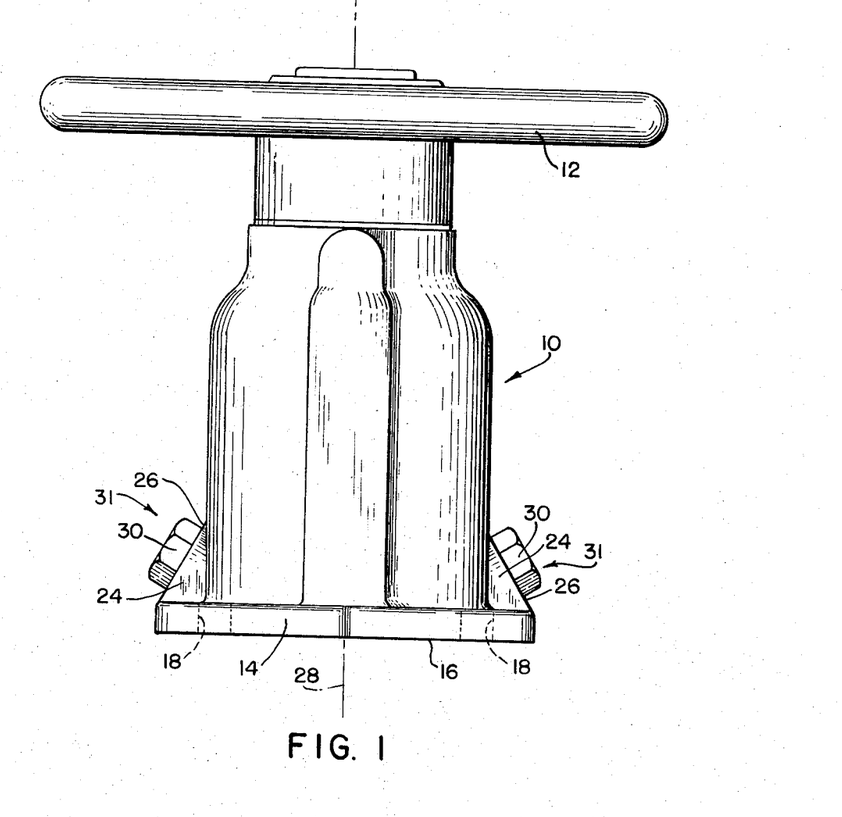
FIGURE 1 is a side elevation view of a bonnet and actuating mechanism subassembly in accordance with the invention.

Referring now more particularly to the drawings, FIG. 1 reveals the outside appearance of a frame member (bonnet) 10 and handwheel 12 in accordance with the present invention. The bonnet shape is the same employed in prior art, and has the usual flange 14 at the end opposite the handwheel. The flange surface 16 adapted to engage the diaphragm 17 and flange holes 18 are provided to receive the bolts which secure the bonnet to the body 22 (see FIG. 10).

The bonnet wall adjacent the flange 14 is provided with a pair of opposed bosses 24 having surfaces 26 angled with respect to the bonnet axis 28. The heads 30 of stop bolts 31 bear firmly against these surfaces.

Figure 2:
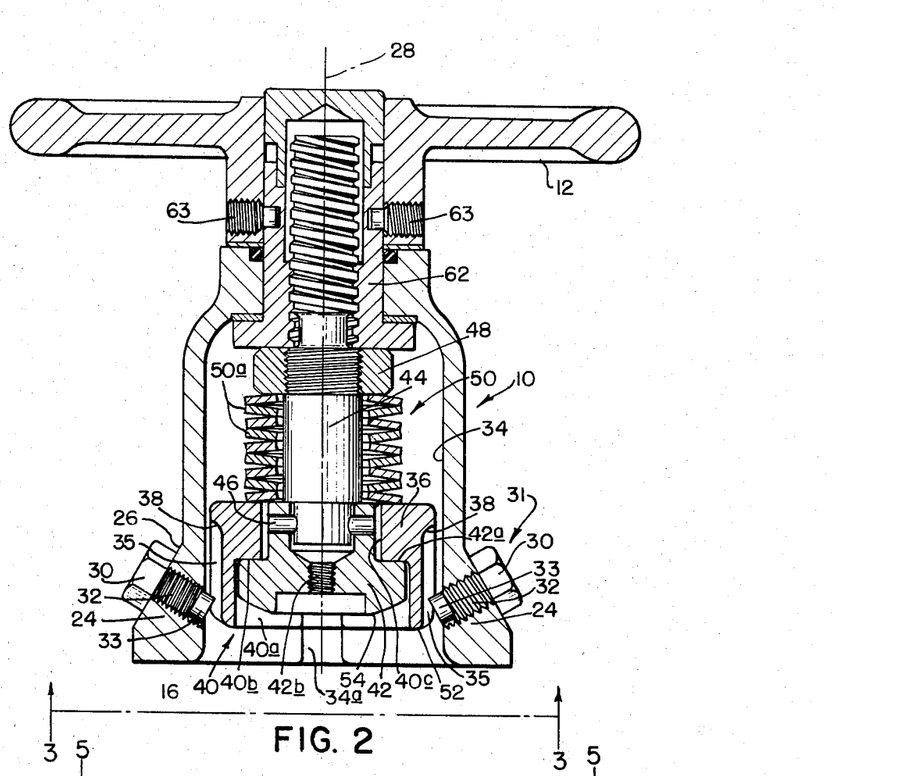
FIGURE 2 is a sectioned side elevation view of the subassembly of FIG. 1 with the compressor shown fully retracted and the compressor parts in a first relative position.
Figure 3:
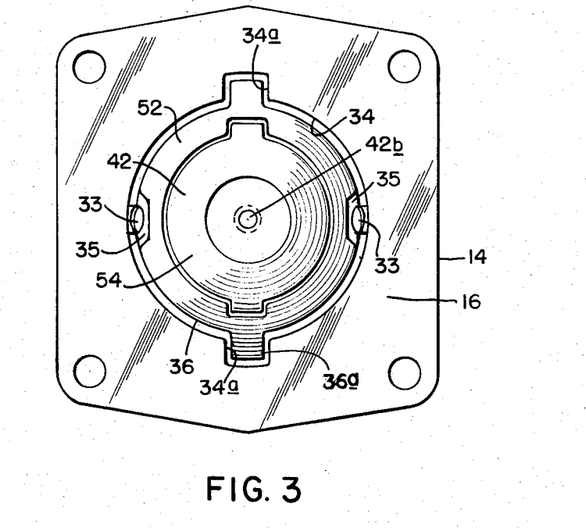
FIGURE 3 is a bottom plan view taken on line 3—3 of FIG. 2.

FIGURE 2 is a cross-sectioned view of the apparatus of FIG. 1 and shows that the shank of each bolt 31, is threaded into the bonnet wall and has its reduced end 33 reaching somewhat beyond the interior bonnet surface 34. Each such bolt end extends into a slot 35 formed in the side of a single outer compressor part 36 which fits close to the bonnet surfaces 34 and is movable with respect thereto along the bonnet axis. The sides of the slots 35, are spaced from the bolt ends 33 and are parallel to the bonnet axis 28 so that movement of the compressor part 36 along this axis is permitted. The slots 35 have closed ends 38 for a purpose which will presently be explained.

Compressor part 36 also has a stepped axial passage 40 therethrough concentric with bonnet axis 28. This passage has a large diameter cylindrical portion 40a at its lower end, a transverse shoulder 40b and a small diameter cylindrical portion 40c at its upper end. A correspondingly stepped inner compressor part 42 lies closely within the passage 40 and has a transverse shoulder 42a presented toward the passage shoulder 40b. The inner compressor part 42, in turn, has an axial passage 42b enlarged at its upper end to receive the valve stem 44 and connected thereto by a cross pin 46. This pin allows a slight rocking of the inner compressor part 42 with respect to the stem. Farther up, the stem has threaded thereon a nut 48 retaining the upper end of a spring 50 which has its lower end bearing against the outer compressor part 36. In this embodiment the spring 50 comprises a stack of Belleville spring 50a having, in their uncompressed condition, a height somewhat greater than the distance which exists between the nut 48 and compressor part 36 when the shoulders 40b and 42a are in engagement. In other words, in the positions of the parts shown in FIG. 2 the spring is deflected and tends to hold the compressor part shoulders together in a first relative position. This position is the one shown in FIG. 2 in which the inner compressor part 42 is withdrawn into the outer compressor part passage 40 as far as it will go and the lowermost diaphragm-engaging surfaces 52 and 54 of the respective compressor parts are not contiguous. Rather surface 54 is held recessed substantially above surface 52.

Figure 4:
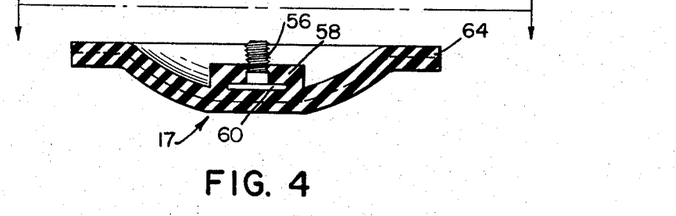
FIGURE 4 is a sectioned side elevation view of the kind of a diaphragm commonly used with the apparatus of FIGS. 1 to 3.

The central portion of the inner compressor part passage 42b is reduced and threaded to receive the threaded shank 56 of the usual diaphragm stud, and the lower portion of this passage is enlarged again to receive the diaphragm boss 58 in which the head 60 of this stud is embedded. FIG. 4 shows a diaphragm 17 of the molded closed type, and it is clear that with the compressor parts held up in the bonnet, as shown in FIG. 2, the stud shank 56 could not be threaded into the passage 42b without distorting the diaphragm substantially.

Figure 5:
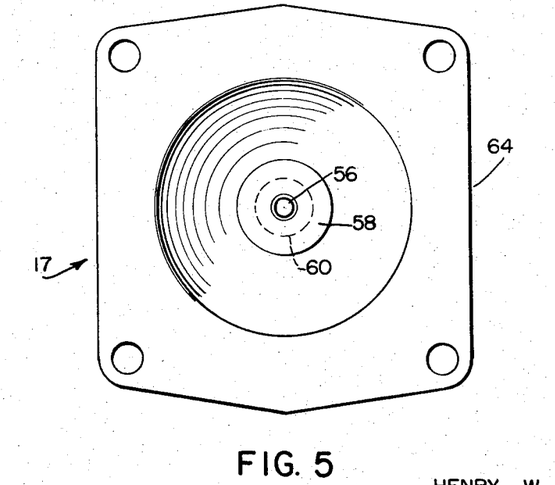
FIGURE 5 is a top plan view of the diaphragm of FIG. 4 taken on line 5—5 thereof.
Figure 6:
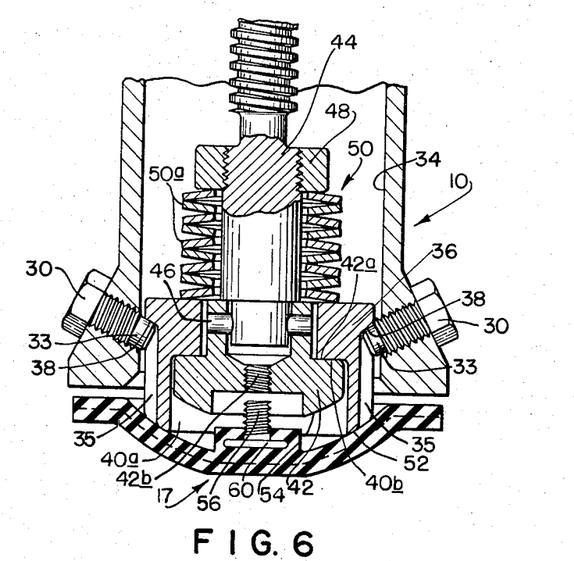
FIGURE 6 is a view like FIG. 2 but showing only a portion of the bonnet and actuating mechanism showing both the compressor parts advanced until the diaphragm-engaging surfaces thereof are exposed at the bonnet end and showing that the first relative position of the compressor parts prevents connection of the diaphragm.

The FIG. 2 arrangement is achieved by locating the stem 44 in its valve open position. Above the nut 48 the stem 44 is threaded into a bushing 62 of the usual construction for valves of this kind. More particularly this bushing is journalled in the upper bonnet end and is fitted with the handwheel 12 by set screws 63. Rotating the handwheel in one direction lowers the stem within the bushing until the compressor parts extend somewhat out of the bonnet's lower end. This is shown in FIGURE 6. The handwheel has been rotated until each compressor slot end 38 engages a bolt end 33. In FIGURE 6 the diaphragm of FIGS. 4 and 5 is shown located as close as possible to the compressor without distortion of the diaphragm material. Connection is still not possible, however, because the outer compressor part surface 52 engages the diaphragm and prevents the stud shank 56 from reaching the tapped portion of hole 42b in the inner compressor part.

Figure 7:
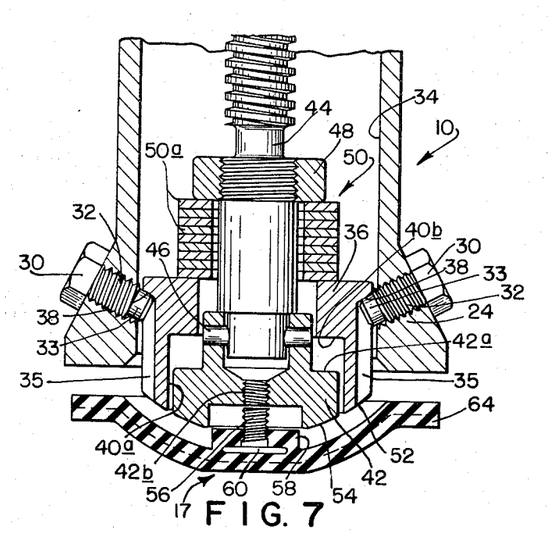
FIGURE 7 is a view like FIG. 6 but showing that by holding one compressor part in its FIG. 6 position and further advancing the other compressor part a second relative position is achieved which permits connection of the diaphragm.
Figure 8:
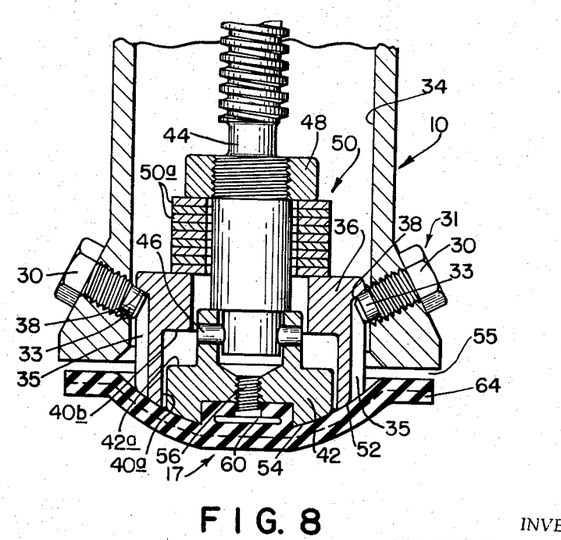
FIGURE 8 is a view like FIG. 7 but showing the diaphragm completely connected.

FIGURE 7 shows how the present invention comes into operation to permit this connection as a result of further rotation of the handwheel 12 in the same direction. The bolt ends 33 prevent any corresponding movement of the outer compressor part 36, but the inner compressor part 42 continues to move with the stem, separating the shoulder surfaces 40b and 42a and further compressing spring 50. Preferably this movement of the stem is continued until the lower compressor surfaces 52 and 54 are in registration. The position of the diaphragm 17 in FIG. 7 shows that the stud is easily connected to the inner compressor part. FIG. 8 shows such a connection completed and further shows that thereafter the diaphragm periphery 64 is still slightly spaced (55) from the lower bonnet end. The bolt ends 33 and the slot ends 38 are purposely arranged so that this space will occur. It prevents the bonnet end from interfering with the rotation of the diaphragm during threading of the diaphragm stud into the inner compressor part. It is preferred to have the spring 50 go solid just as the surfaces 52 and 54 reach the registration shown in FIG. 8. When thus deposed these surfaces cooperate to press the diaphragm against its seat for complete valve closure.

Figure 9:
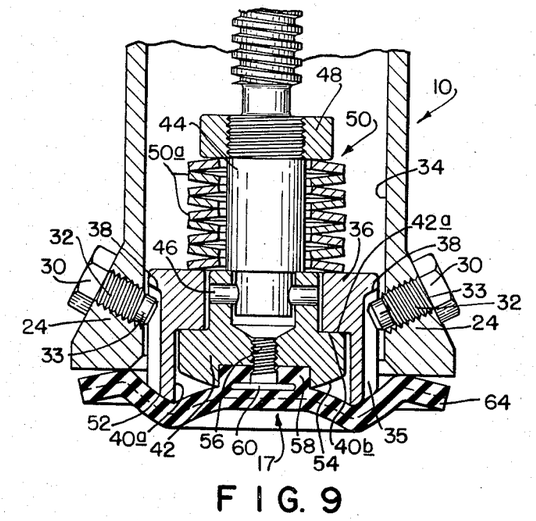
FIGURE 9 is a view like FIG. 8 but showing the compressor partly retracted into the bonnet.

FIGURE 9 shows what happens when the handwheel is turned in the opposite direction to prepare the sub-assembly for mounting on a valve body. Initially the stem 44 and inner compressor part 42 move up in the bonnet from their positions of FIG. 8. Because of the deflection in the spring 50 the outer compressor part 42 remains held against bolt ends 33 right up to the point where the shoulder 42a engages the shoulder 40b. Thereafter further upward movement of the stem moves both compressor parts in unison and carries the outer compressor part 36 away from the bolt ends 33. This movement soon brings the diaphragm periphery 64 into contact with the bonnet end, whereupon the bonnet, actuating mechanism and diaphragm are now ready for mounting on the valve body 22. The retraction of the inner compressor part 42 into the outer compressor part passage 40 distorts the diaphragm in the manner shown in FIG. 9, but this does not alter the position of the diaphragm periphery 64 sufficiently to prevent correct mounting of the sub-assembly on a body.

Figure 10:
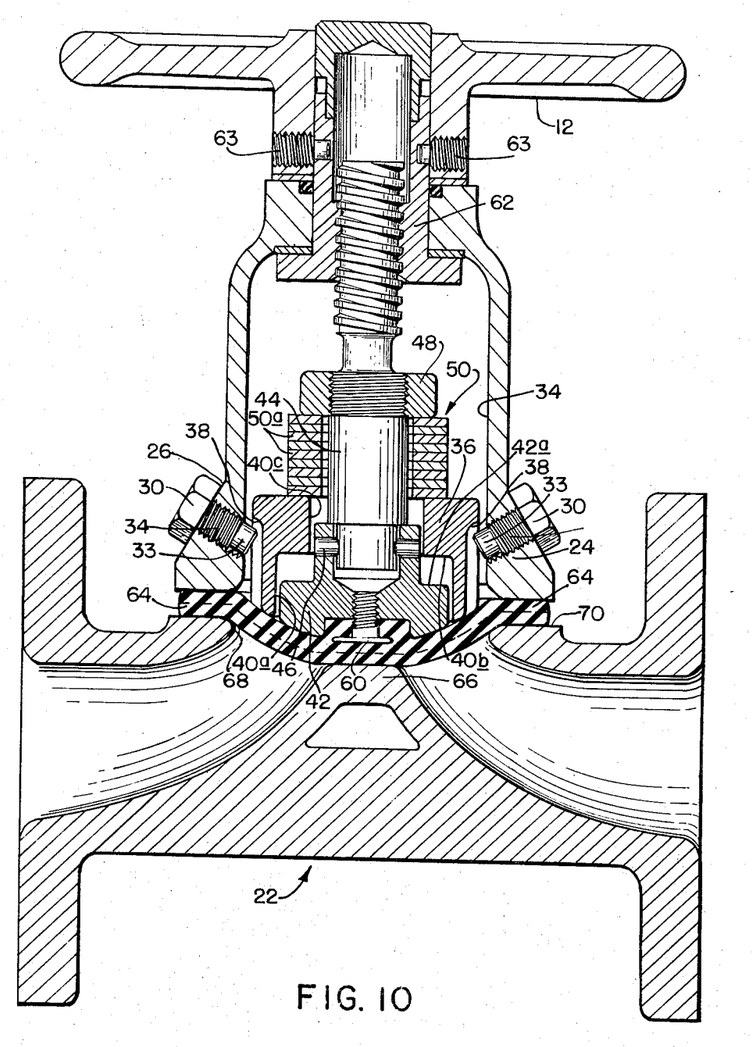
FIGURE 10 is a sectioned side elevation view of a complete valve employing the bonnet, diaphragm and actuating mechanism of FIGS. 1 to 9.
Figure 11:
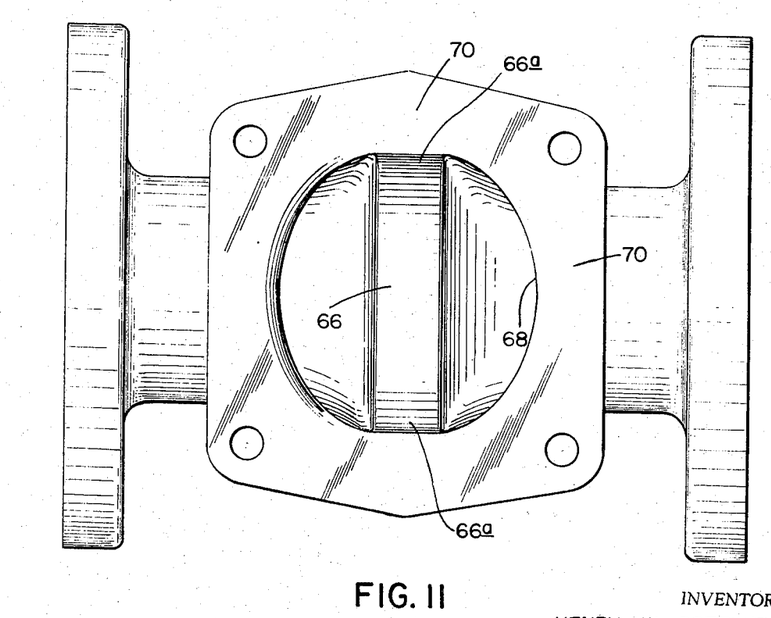
FIGURE 11 is a top plan view of the body of FIG. 10 apart from the bonnet, diaphragm and actuating mechanism.
Figure 12:
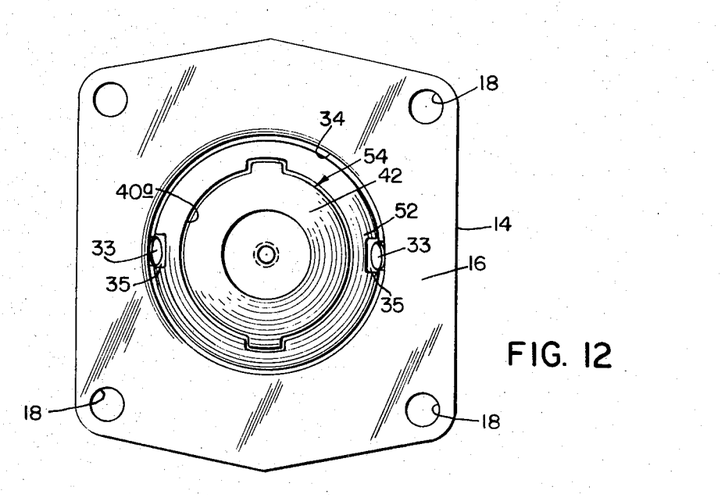
FIGURE 12 is a bottom plan view of the compressor assembly of FIGURE 10.

FIGURE 10 shows a complete valve assembly with the compressor in the valve-closed position. In this position the diaphragm is held against a weir 66 which extends across the diaphragm opening 68 and has its ends 66a with the opening rim 70 against which the diaphragm periphery 64 is clamped. The outer compressor part surface 52 holds the diaphragm against these weir end portions, while the inner compressor part surface 54 holds the diaphragm center against the weir center 66. During initial opening of the assembled valve from the completely closed position the outer compressor part 36 continues to hold the diaphragm against the weir end portions 66a while the inner compressor part 42 pulls the diaphragm away from the weir center portion 66b. When the inner compressor part shoulder 42a finally engages the outer compressor part shoulder 40b the outer compressor part 36 also begins to move away from the weir and the inner compressor part 42 can then pull the diaphragm from all parts of the weir including the end portion 66a. This eventually leads to a completely open position.

FIGURE 10 illustrates particularly well that when the valve is completely assembled the bolt ends 33 cannot interfere with the required closing movements of the outer compressor part 36. Even when this outer compressor part is in its fully closed position the slot ends 38 do not engage the bolt ends 33. Thus when the valve is completely assembled it is not necessary to remove the bolt ends 33 from the paths of the slot ends 38. In fact these bolt ends lying in the slots can serve an additional function, namely that of preventing rotation of the outer compressor part 36 during valve operation, so that it is unnecessary to provide the conventional bonnet wall slots 34a and so that it is unnecessary to provide extensions 36a on the outer compressor part. Thus, in the prior art and in the embodiments of FIGS. 1 to 11 these axial slots accommodate these compressor extensions and thereby prevent the compressor rotation which tends to occur because of the friction in the stem and bushing threads.

Each of the bolts 31 is shown in the drawings at an angle to the bonnet axis 28 which is other than 90°. This locates the bolt heads 30 as far as possible from the bonnet surface 16 and at the same time locates the bolt ends 33 as close to the bonnet end as possible. The bolt heads can be more easily engaged by tools in these positions, and the outer compressor part need not have any unusual axial extension for accommodating the slot 35.

I claim:
1. A diaphragm valve actuating mechanism assembly comprising:
 (I) a frame member,
 (II) a compressor which:
  (A) is mounted on said frame member,
  (B) has:
   (1) a first part,
   (2) at least one other part which:
    (a) has first and second relative positions with respect to said first part,
    (b) is movable with respect to said first part between said first and second relative positions,
 (III) means for moving said first compressor part with respect to said frame member through a predetermined range,
 (IV) means for holding said other compressor part in said first relative position during movement of said first compressor part through a portion of said range,
 (V) means connected to said frame member for directly engaging and arresting said other compressor part and preventing movement thereof, with respect to said frame member upon movement of said first compressor part into the remainder of said range, whereby said movement of said first compressor part by said moving means through the remainder of said range causes said other compressor part to approach its second relative position with respect to said first compressor part.

2. A diaphragm valve actuating mechanism assembly comprising:
 (I) a bonnet member,
 (II) a stem member which:
  (A) is mounted on said bonnet member,
  (B) is movable with respect to said bonnet member through a predetermined range,
 (III) a compressor which:
  (A) is located in said bonnet member,
  (B) has:
   (1) a first part carried on said stem member,
   (2) a second part which:
    (a) has first and second relative positions with respect to said first part,
    (b) is movable with respect to said first part between said first and second relative positions,
 (IV) a spring which:
  (A) is connected between said second compressor part and one of said bonnet and stem members,
  (B) resiliently holds said second compressor part in said first relative position during movement of said stem member through a portion of its range,
 (V) a stop which:
  (A) is mounted on said bonnet member, (B) is directly engaged by and arrests said second compressor part when said stem member moves into the remaining portion of said range, whereby said stem member movement through the said remaining portion of said range causes said second compressor part to assume its second relative position with respect to said first compressor part.

3. A diaphragm valve actuating mechanism assembly comprising:
(I) a hollow bonnet member which:
  (A) has a diaphragm opening at one end,
  (B) has a stem opening at the opposite end,
(II) a stem member which:
  (A) is mounted in said bonnet member stem opening,
  (B) extends toward said bonnet member diaphragm opening,
  (C) is movable with respect to said bonnet member through a predetermined range,
(III) a compressor which:
  (A) is located in said bonnet member,
  (B) has a central part which:
    (1) is carried on said stem member,
    (2) has a coupling surface,
  (C) has an outer part which:
    (1) surrounds said central compressor part,
    (2) has a coupling surface,
    (3) has a first position relative to said central compressor part in which said coupling surfaces engage each other,
    (4) has a second position relative to said central compressor part in which said coupling surfaces are spaced apart,
    (5) is movable with respect to said central compressor part between said first and second relative positions,
(IV) a spring which:
  (A) is connected between said outer compressor part and one of said bonnet and stem members,
  (B) resiliently holds said compressor part coupling surfaces in engagement with each other during movement of said stem member through a portion of its range,
(V) a stop which:
  (A) is mounted on said bonnet member,
  (B) is engaged by and arrests said outer compressor part when said stem member moves into the remaining portion of its range, whereby said stem member movement through the said remaining portion of said range in a direction away from said range portion causes said outer compressor part to assume its second relative position with respect to said central compressor part.

4. A diaphragm valve actuating mechanism assembly as set forth in claim 3 wherein said spring is connected between said outer compressor part and said stem member.

5. A diaphragm valve actuating mechanism assembly as set forth in claim 3 wherein said spring is in a deflected condition when said outer compressor part engages said stop and said compressor part coupling surfaces are in engagement with each other.

6. A diaphragm valve actuating mechanism assembly as set forth in claim 3 wherein said spring comprises a nest of Belleville springs.

7. A diaphragm valve actuating mechanism assembly as set forth in claim 3 wherein said bonnet has a side wall and wherein said stop comprises at least one bolt extending through said side wall.

8. A diaphragm valve actuating mechanism assembly as set forth in claim 7 wherein said bonnet side wall has an interior surface and wherein one end of said bolt extends inwardly beyond said interior surface.

9. A diaphragm valve actuating mechanism assembly as set forth in claim 8 wherein said outer compressor part has a groove in which said bolt end slidably fits and the end of which contacts said bolt end to achieve said arresting of said outer compressor part.

10. A diaphragm valve actuating mechanism assembly as set forth in claim 3 wherein said bonnet has a side wall and wherein said stop comprises a plurality of bolts extending through said side wall adjacent said diaphragm opening and in spaced relation therearound.

11. A diaphragm valve having:
(I) a body which has:
  (A) a pair of end openings,
  (B) side walls having interior surfaces,
  (C) a flow passage which:
    (1) is defined by said interior surfaces,
    (2) extends between said end openings,
  (D) a diaphragm opening which:
    (1) is located in said side walls,
    (2) communicates with said passage,
    (3) has a rim therearound,
  (E) a diaphragm seat which:
    (1) is formed on said interior surfaces,
    (2) is opposite said diaphragm opening;
(II) a diaphragm which:
  (A) is flexible,
  (B) has a peripheral portion engaging the said rim of said body diaphragm opening,
  (C) has a domed central portion which:
    (1) covers said body diaphragm opening,
    (2) moves through said body diaphragm opening during closing of the valve,
    (3) engages said seat to close the valve,
(III) a bonnet member which:
  (A) is hollow,
  (B) has a diaphragm opening at one of its ends,
  (C) has a rim which:
    (1) is around its diaphragm opening,
    (2) engages said diaphragm peripheral portion,
(IV) means for connecting said bonnet member to said body,
(V) a compressor which:
  (A) is located in said bonnet member,
  (B) has a central part which:
    (1) is presented toward a first section of said diaphragm central portion,
    (2) is connected to said first diaphragm section,
    (3) is movable:
      (a) with respect to said bonnet member,
      (b) in a direction toward said bonnet member diaphragm opening,
      (c) through a predetermined range,
      (d) to a closed position in which it presses said first diaphragm section against said seat,
  (C) has an annular outer part which:
    (1) surrounds said central compressor part,
    (2) is presented toward a second section of said diaphragm central portion,
    (3) is movable in unison with said central compressor part:
      (a) through a position of said range,
      (b) to a closed position in which it presses said second diaphragm section against said seat,
    (4) has an arresting surface which:
      (a) defines a path upon movement of said outer compressor part in said direction,
      (b) is located at a certain place on said path when said outer compressor part is in said closed position,
(VI) a stop which:
  (A) is mounted on said bonnet member,
  (B) is located:

(1) in said path of said arresting surface,
(2) between said arresting surface and said bonnet member diaphragm opening,
(3) out of contact with said arresting surface when said outer compressor part is in said closed position, whereby the said arresting surface on said outer compressor part is free from engagement with said stop when said valve is assembled and whereby said arresting surface engages said stop and said outer compressor part is arrested when said bonnet member is disconnected from said body and said outer compressor part is moved in said direction to carry said arresting surface beyond said certain place.

12. A diaphragm valve having:
(I) a body which has:
  (A) a pair of end openings,
  (B) side walls,
  (C) a flow passage which:
    (1) is defined by said side walls,
    (2) extends between said end openings,
  (D) a diaphragm opening which:
    (1) is located in said side walls,
    (2) communicates with said passage,
    (3) has a rim therearound,
  (E) a diaphragm seat which:
    (1) is formed on the interior surfaces of said side walls,
    (2) is opposite said diaphragm opening,
(II) a diaphragm which:
  (A) is flexible,
  (B) has a peripheral portion engaging the said rim of said body diaphragm opening,
  (C) has a domed central portion which:
    (1) covers said body diaphragm opening,
    (2) moves through said diaphragm opening during closing of the valve,
    (3) engages said seat to close the valve,
(III) a bonnet member which:
  (A) is hollow,
  (B) has a diaphragm opening at one of its ends,
  (C) has a rim which:
    (1) is around its diaphragm opening,
    (2) engages said diaphragm peripheral portion,
  (D) has a stem opening at its opposite end,
(IV) a stem member which:
  (A) is mounted in said bonnet member stem opening,
  (B) extends toward said bonnet member diaphragm opening,
  (C) is movable:
    (1) with respect to said bonnet member,
    (2) toward said bonnet member diaphragm opening,
    (3) through a predetermined range,
(V) a compressor which:
  (A) is located in said bonnet member,
  (B) has a central part which:
    (1) is carried on said stem member,
    (2) is connected to said diaphragm central portion,
    (3) has a coupling surface presented away from said bonnet member diaphragm opening,
  (C) has an outer annular part which:
    (1) surrounds said central compressor part,
    (2) has a coupling surface presented toward said central part coupling surface,
    (3) has a first position relative to said central compressor part in which:
      (a) the said coupling surfaces engage each other,
      (b) the outer compressor part holds a first section of said diaphragm central portion against said seat,
    (4) has a second position relative to said central compressor part in which:
      (a) said coupling surfaces are spaced apart,
      (b) the outer compressor part continues to hold said first diaphragm section against said seat,
    (5) is movable with respect to said central compressor part between said first and second relative positions,
(VI) a spring which:
  (A) is connected between said outer compressor part and one of said bonnet and stem members,
  (B) resiliently holds said compressor part coupling surfaces in engagement with each other during said movement of said stem member through a portion of said range,
(VII) a stop which:
  (A) is mounted on said bonnet member,
  (B) is in the path of said movement of said outer compressor part,
  (C) is out of engagement with said outer compressor part when said outer compressor part is in said second relative position, whereby said outer compressor part is free from arrest by said stop while said valve is assembled and whereby said outer compressor part is arrested by said stop when said bonnet member is removed from said body and said stem has been moved through said portion of its range.

References Cited

UNITED STATES PATENTS 2,388,989    11/1945    Mueser _____________ 251—331 X
2,853,270    9/1958    Boteler _____________ 251—331

FOREIGN PATENTS 1,271,905    8/1961    France.

M. CARY NELSON, *Primary Examiner.*

A. ROSENTHAL, *Assistant Examiner.*